Patented Aug. 15, 1933

1,922,123

UNITED STATES PATENT OFFICE 1,922,123

INULIN NITRATE AND METHOD OF PRODUCING

Willard de C. Crater, Succasunna, N. J., assignor to Hercules Powder Company, Wilmington, Del., a Corporation of Delaware No Drawing. Application August 6, 1931
Serial No. 555,533

3 Claims. (Cl. 260—145)

This invention relates to a new composition of matter and method for its production. The composition in accordance with this invention is more particularly inulin nitrate.

The new composition in accordance with this invention, inulin nitrate, is normally a solid softening at about 90° C., melting at about 102° C. and decomposing at about 110° C. The compound is not very sensitive to impact (30 cm. falling weight test) and will flash at 228° C.–230° C., but not under 226° C. It is optically active, being levorotatory, and has a specific rotation of about 18°.

The compound is insoluble in water, ether, ethyl and methyl alcohol, toluene and carbon tetrachloride, but dissolves in acetone, ether-ethyl alcohol mixture, concentrated sulphuric acid, ethyl acetate, etc. The compound does not crystallize from solution, but forms a film.

The compound has various uses in the commercial arts as, for example, as an explosive ingredient in dynamite and smokeless powder; as an ingredient in detonating fuse, delay caps and ignition or flash mixture; as an ingredient in lacquers, since it is compatible with nitrocellulose and nitrostarch, soluble in similar solvents and will deposit a transparent film from solution.

The compound may be prepared by the treatment of inulin

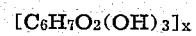

with a nitrating mixture composed, for example, of nitric and sulphuric acids, followed by washing and neutralization for the elimination from the product of nitrating mixture.

By way of illustration the new compound may be prepared by subjecting inulin to nitration with a mixture comprising 48.50% of nitric acid and 51.20% of sulphuric acid, or with a mixture comprising 20.8% of nitric acid and 62.8% of sulphuric acid.

The nitrogen content of the product, inulin nitrate may be varied by altering the mixed acid mixture used for nitration. Thus, for example, a 48.5% of nitric acid and 51.2% of sulphuric acid mixture will give a product having a nitrogen content of 13.75% while a 20.8% nitric acid and a 62.8% sulphuric acid mixture will give a product containing 12.80% nitrogen.

The nitration procedure, washing and neutralization will follow the usual procedure well known to the art in connection with the nitration of, for example, starch and any suitable form of apparatus may be used.

As illustrative of the commercial use of the new composition in accordance with this invention, for example, a satisfactory dynamite containing inulin nitrate, primarily as a sensitizer, may be produced in accordance with the following formula:

|  | Percent |
|---|---|
| Inulin nitrate (13.75% nitrogen) | 20 |
| Ammonium nitrate | 65 |
| Sodium nitrate | 11 |
| Pulp (for example wood pulp) | 4 |

The dynamite in accordance with the above fomula will be found to flow and pack easily and to be not dusty. It will be non-freezing and non-headache. The dynamite will have the following characteristics:

| | |
|---|---|
| Stick weight | 120 grams |
| Cartridge count | 378 per 100 lbs. |
| Sensitiveness | 4" |
| Rate | 2310 M/S |
| Weight strength | 53.5% |

As further illustrative, for example, inulin nitrate may be used in blasting caps, as for example, a base charge under a primer charge of fulminate-chlorate mixture. Thus, for example, a standard blasting cap shell may be charged with .16 gram of nitroinulin (13.75% N) pressed under 7840 pounds per square inch and provided with a primer charge of .3 grams of 80/20 fulminate-chlorate mixture. Such a cap will give a plate having a good sunburst, will make a clean hole in the plate, and will be found satisfactory for the detonation of explosives.

As has been indicated, inulin nitrate may be used in various explosives compositions and due to its characteristic of depositing a film from solutions rather than crystallizing therefrom, its compatibility with nitrostarch and nitrocellulose and its solvency in various nitrocellulose and nitrostarch solvents, it is adaptable as an ingredient for lacquers.

It will be understood that I contemplate as a part of my invention the new composition of matter described herein, the method for its production and all and several of the uses to which it may be put.

What I claim and desire to protect by Letters Patent is:

1. The method of producing inulin nitrate which includes subjecting inulin to nitration with a mixture of nitric and sulphuric acids.

2. As a new composition of matter inulin nitrate.

3. The method of producing inulin nitrate, which includes subjecting inulin to nitration.

WILLARD DE C. CRATER.